(12) United States Patent
Nielsen

(10) Patent No.: US 6,908,408 B2
(45) Date of Patent: Jun. 21, 2005

(54) MULTIPLE-SPEED POWER TRANSMISSION FOR MOTOR VEHICLES

(75) Inventor: Albert Nielsen, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/662,104

(22) Filed: Sep. 12, 2003

(65) Prior Publication Data

US 2005/0059527 A1 Mar. 17, 2005

(51) Int. Cl.[7] ................................................ F16H 3/62
(52) U.S. Cl. .................... 475/279; 475/275; 475/276; 475/280; 475/281; 475/282; 475/283; 475/286; 475/287
(58) Field of Search ............................ 475/275, 276, 475/279, 280, 281, 282, 283, 286, 287

(56) References Cited

U.S. PATENT DOCUMENTS

| | | | |
|---|---|---|---|
| 3,996,817 A | * 12/1976 | Winzeler | .............. 475/69 |
| 4,070,927 A | 1/1978 | Polak | |
| 5,106,352 A | 4/1992 | Lepelletier | |
| 5,226,862 A | * 7/1993 | Hattori | .............. 475/286 |
| 5,435,792 A | 7/1995 | Justice et al. | |
| 6,517,463 B2 | * 2/2003 | Sugiura et al. | .............. 475/287 |
| 6,705,969 B2 | * 3/2004 | Bucknor et al. | .............. 475/290 |
| 6,736,752 B2 | * 5/2004 | Usoro et al. | .............. 475/296 |
| 2001/0034284 A1 | * 10/2001 | Sugiura et al. | .............. 475/271 |

* cited by examiner

Primary Examiner—Charles A. Marmor
Assistant Examiner—David D. Le
(74) Attorney, Agent, or Firm—David B. Kelley; MacMillan, Sobanski & Todd

(57) ABSTRACT

A multiple-speed transmission for use in an automotive vehicle driveline includes a torque converter, three simple planetary gear units, or two simple planetary gear units and a compound planetary gear unit, friction clutches and brakes, and an optional one-way coupling. The engaged and disengaged states of the friction elements permit the transmission to produce several underdrive speed ratios, a direct drive ratio, and several overdrive speed ratios.

12 Claims, 2 Drawing Sheets

| RANGE | 64 | 66 | 68 | 72 | 74 |
|---|---|---|---|---|---|
| 1ST | X | | | | X |
| 2ND | X | | | X | |
| 3RD | X | | X | | |
| 4TH | X | X | | | |
| 5TH | | X | X | | |
| 6TH | | X | | X | |
| REV. | | | X | | X |

MULTIPLE-SPEED POWER TRANSMISSION FOR MOTOR VEHICLES

BACKGROUND OF THE INVENTION

This invention relates to the field of automatic transmissions for motor vehicles. More particularly, the invention pertains to the kinematic arrangement of planetary gearing, clutches, brakes, and overrunning couplings for such transmissions.

Minimizing the package size of a geared automatic transmission for motor vehicles, its lateral dimensions and particularly its axial dimensions, has long been an objective in the automotive industry. Realizing this goal has become more difficult because of the need for transmissions to provide a continually increasing number of forward gear ratios and a need for non-synchronous shifting among the gear ratios. Automatic transmissions having five and six forward gear ratios are replacing current transmissions having four and five forward gear ratios.

In order to minimize the axial length of an automotive transmission, the number of friction clutches and brakes is minimized. It has become conventional to provide non-synchronous gear ratio changes, especially among the lower gears, by providing a one-way coupling in parallel with a hydraulically actuated friction clutch or brake. However, a one-way coupling requires additional space along the axis of the transmission. Its presence also adds to assembly time, material cost, and weight.

In addition to minimizing the package size of automatic transmissions, it is important also to minimize the rotational speed of the pinion gears, which are supported on a carrier of the planetary gear units within the transmission.

Excessive planet pinion gear speed can adversely affect the service life of the bearings on which the planet pinions are supported for rotation on the carrier. It is not uncommon that the rotational speed of planet pinions of certain gear units be five to seven times the engine speed.

SUMMARY OF THE INVENTION

It is an advantage of this invention that the rotational speed of the planet pinion gears is relatively low in comparison to transmissions in the prior art, and that the transmission is compact and has a minimal axial length. Nearly ideal steps between gear ratios can be obtained with reasonable "betas" in all gearsets. Beta is the ratio of the diameter or number of teeth of a ring gear and a sun gear of the same planetary gear unit.

It is another advantage of this invention that six forward speed ratios are produced with only five friction clutches and brakes and without need for an overrunning coupling. However, if non-synchronous gear ratio changes between first gear and second gear are desired, a one-way coupling can be provided in parallel with a friction brake.

In realizing these advantages, a multiple-speed ratio automatic transmission according to this invention includes an input and output. A planetary gear system includes first, second and third planetary gear units, each gear unit having a sun gear, a ring gear, planet pinions meshing with the sun gear, planet pinions meshing with the ring gear, and a carrier rotatably supporting the planet pinions.

Certain gear unit components are functionally secured continually to other components, but some components are releasably secured to others. For example, the input is driveably connected to the sun gear of the first gear unit, the output is driveably connected to the carrier of the third gear unit, the ring gear of the third gear unit is driveably connected to the carrier of the second gear unit, one of the carrier of the first gear unit and the ring gear of the first gear unit is secured against rotation, and the sun gear of the second gear unit is driveably connected to the sun gear of the third gear unit.

A first brake releasably holds the ring gear of the second gear unit against rotation. A second brake releasably holds the carrier of the second gear unit and ring gear of the third gear unit against rotation. A first clutch driveably connects and disconnects the input and the sun gears of the second and third gear units. A second clutch driveably connects and disconnects the input and carrier of the second gear unit. A third clutch releasably connects the other of the carrier of the first gear unit and ring gear of the first gear unit to the ring gear of the second gear unit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
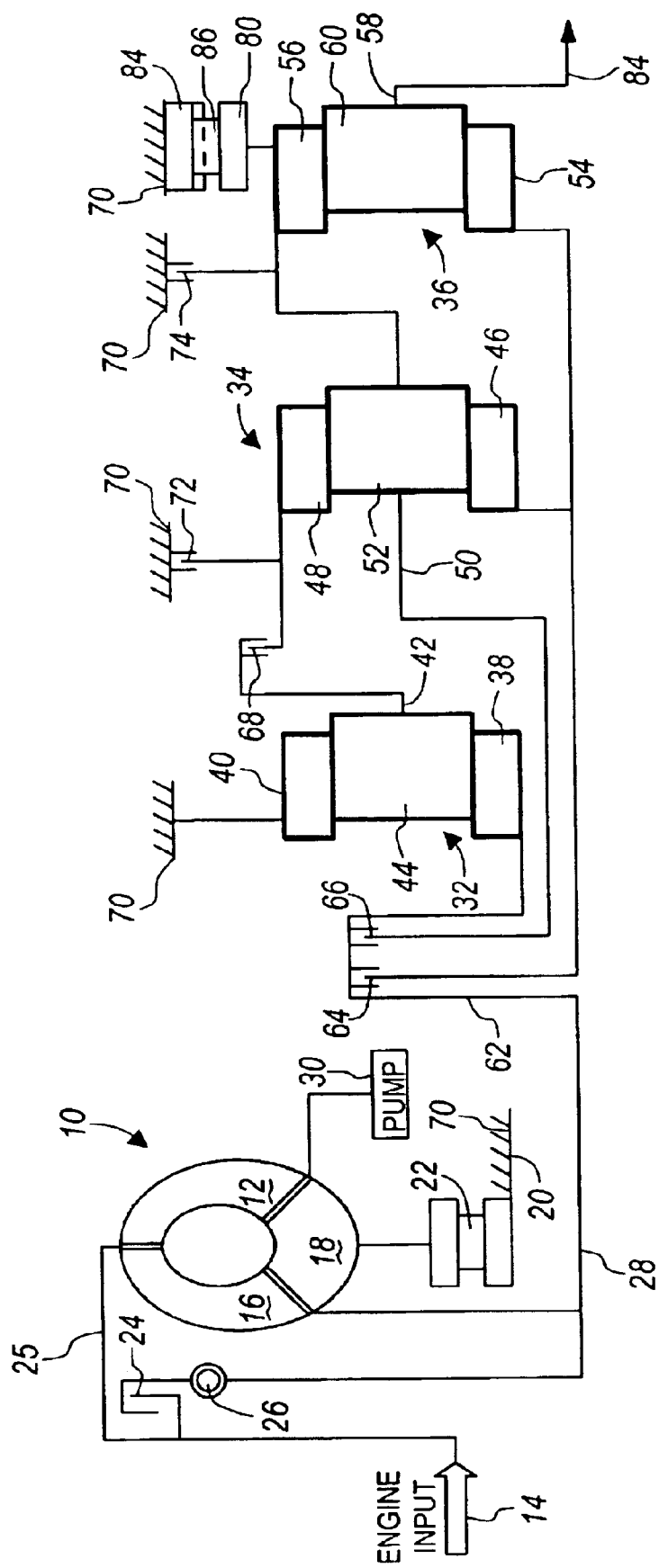
FIG. 1 is a schematic diagram of the kinematic arrangement of the gears, clutches, brakes, and couplings for a preferred embodiment of this invention.

Referring now to the drawings, there is illustrated in FIG. 1 the kinematic arrangement of an automatic transmission according to the present invention. The torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter assembly includes a lockup clutch 24 located within the torque converter impeller housing 25. The torque output side of lockup clutch 24 includes a damper 26 located between the impeller and the turbine shaft, which is the transmission input shaft 28. When clutch 24 is engaged, the turbine and impeller are mechanically connected; when clutch 24 is disengaged, they are hydrokinetically connected and mechanically disconnected. The damper absorbs transitory torque fluctuations associated with engagement of a lockup clutch. Fluid contained in the torque converter is supplied to the torque converter from the output of an oil pump assembly 30 and is returned to an oil sump, to which an inlet of the pump is connected hydraulically.

Planetary gearing includes first, second, and third planetary gear units 32, 34, and 36. The first gear unit 32 includes a sun gear 38, ring gear 40, carrier 42, and planetary pinions 44, supported on carrier 42 in meshing engagement with sun gear 38 and ring gear 40. The second gear unit 34 includes a sun gear 46, ring gear 48, carrier 50, and planetary pinions 52, rotatably supported on carrier 50 in meshing engagement with sun gear 46 and ring gear 48. The third gear unit 36 includes a sun gear 54, ring gear 56, carrier 58, and planetary pinions 60, rotatably supported on carrier 58 in meshing engagement with sun gear 54 and ring gear 56.

Clutch 64 releasably connects input shaft 28 and sun gears 46 and 54. Clutch 66 releasably connects input shaft 28 and carrier 50. Clutch 68 releasably connects carrier 42 and ring gear 48.

Carrier 50 of the second gear unit 34 is continually driveably connected to ring gear 56 of third gear unit 36 and to a brake 74. Member 62 continually driveably connects sun gear 38 to input shaft 28. Ring gear 40 is continually held against rotation on the transmission case 70.

Ring gear 48 is held against rotation on the transmission case 70 by engagement of a first friction brake 72, and ring gear 48 is released for free rotation by disengagement of brake 72. Engagement of the second friction brake 74 holds carrier 50 and ring gear 56 against rotation on the transmission case 70; carrier 50 and ring gear 56 are released for free, independent rotation upon disengagement of brake 74.

Clutches 64, 66, 68 and brakes 72, 74, are hydraulically-actuated friction devices having sets of interleaved friction discs and spacer plates, the discs secured to one element of the clutch or brake, the spacer plates secured to another element of the clutch or brake. Hydraulic pressure forces the discs and plates into frictional contact and completes a drive connection between the components to which the elements of the clutch or brake are secured. When the pressure is vented from the device, the clutch or brake is disengaged and the components are free to rotate independently. U.S. Pat. No. 4,943,921 describes and illustrates examples of hydraulically actuated friction clutches and brakes, and a one-way coupling that can be used in the transmission of this invention.

If non-synchronous gear ratio changes between first gear and second gear are desired, a one-way coupling can be provided in parallel with brake 74. Preferably, the coupling provides a one-way drive connection between the case 70 and the mutually connected ring gear 56 and carrier 50. The coupling produces a drive connection to the case 70 in first gear and it overruns in all other gears. The coupling includes an inner race 80 connected to ring gear 56, which is secured to carrier 50, an outer race 84 secured to case 70 against rotation, and a set of rollers or sprags 86 located between the races and adapted to complete a one-way drive connection between the races.

A differential mechanism (not shown), driveably connected to output 84, transmits power to the drive wheels of a vehicle, as described and illustrated in U.S. Pat. No. 5,261,862. A gear selector lever, controlled by the vehicle operator to select the operating range of the transmission, is movable among positions where the various gear ratios are produced automatically and other positions where the gear ratios are produced manually.

Figures 2, 3:
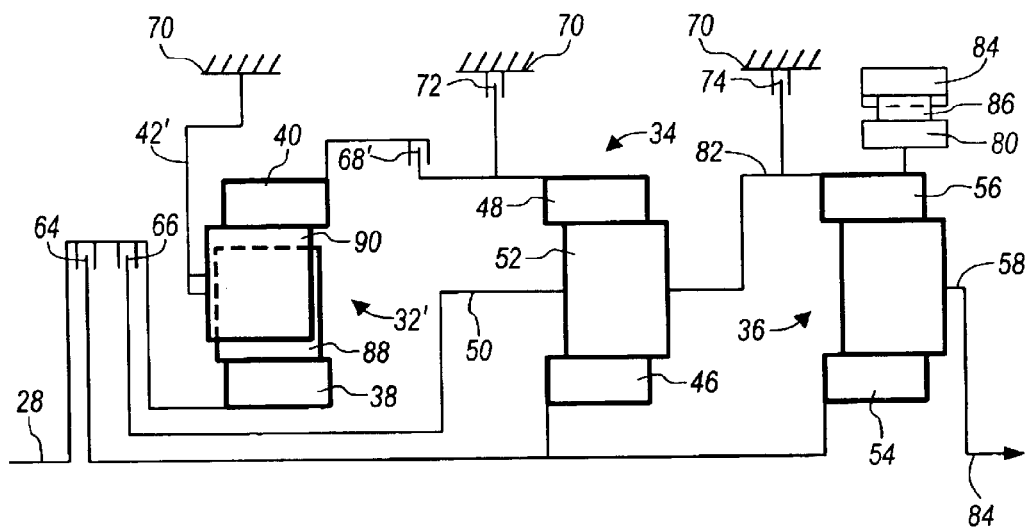
FIG. 2 is a chart that shows the pattern of engagement and release of the clutches and brakes required to produce the various forward drive ratios and reverse drive ratio of the transmission of FIGS. 1 and 3.
FIG. 3 is a schematic diagram of the kinematic arrangement of an alternate embodiment of the automatic transmission of this invention.

Operation of the kinematic components of the transmission is described next with reference to the state of the friction elements and the coupling corresponding to each of the gear ratios. Preferably, the states of the clutches and brakes are changed automatically in accordance with execution of a control algorithm by an electronic transmission controller. FIG. 2 is a chart indicating the state of engagement and disengagement of the clutches and brakes corresponding to each the gear ratios. In the chart, symbol "X" identifies an engaged friction clutch and friction brake. A blank indicates that the corresponding clutch and brake is disengaged or released.

When the transmission operates in the first gear ratio, forward clutch 64 is engaged and brake 74 is engaged, thereby holding ring gear 56 against rotation on the transmission casing 70. The first speed ratio, produced in the third gear unit 36, is taken at carrier 58, which is underdriven in relation to the speed of input 28. Carrier 58 drives output shaft 84.

An upshift to the second speed ratio results by maintaining forward clutch 64 engaged, engaging brake 72, and disengaging brake 74. Sun gears 46 and 54 are driven at the speed of input shaft 28. Ring gear 48 provides the torque reaction on case 70. Carrier 50, which is underdriven in the second gear unit 34, drives ring gear 56. Therefore, carrier 58 is underdriven at a faster speed than in first gear.

An upshift to the third speed ratio from the second speed ratio results upon disengaging brake 72 and engaging clutch 68, while maintaining the forward clutch 64 engaged. The sun gears 38, 46 and 54 are driven at the speed of input shaft 28. Ring gear 40, held against rotation on case 70, provides the torque reaction. Carrier 42, which is underdriven in the first gear unit 32, drives ring gear 48 through clutch 68. Carrier 50 and ring gear 56 are under driven in relation to the speed of input 28 but are overdriven in relation to carrier 42. Carrier 58 and output 84 are underdriven, but at a faster speed than in second gear.

A fourth forward speed ratio is produced by maintaining forward clutch 64 engaged, engaging clutch 66, and disengaging the other friction elements. Sun gears 46 and 54, and the mutually interconnected carrier 50-ring gear 56 subassembly are driven at the speed of input shaft 28 through clutches 64 and 66, respectively. Therefore, the third gear unit 36 is locked-up and output shaft 84 is driven at the speed of shaft 28, a direct drive speed ratio.

The fifth speed ratio is produced upon engaging clutches 66 and 68, and disengaging clutch 64. Ring gear 40 provides the torque reaction on the case 70. Carrier 42, the underdriven output of the first gear unit 32, drives ring gear 48 through clutch 68. Carrier 50 and ring gear 56 are driven at the speed of the input shaft 28 through clutch 66. Sun gear 46, the overdriven output of the second gear unit 34, drives sun gear 54. Therefore, output carrier 58 and output shaft 84 are overdriven compared to the speed of input shaft 28.

The sixth forward speed ratio results when clutch 66 and brake 72 are engaged, and the other friction elements are disengaged. Carrier 50 and ring gear 56 are driven at the speed of input shaft 28 through clutch 66. Ring gear 48 is held against rotation, thereby providing a torque reaction on the case 70. The second gear unit 34 overdrives sun gears 46 and 54. An additional speed increase occurs in the third gear unit 36, whereby carrier 58 and shaft 84 are overdriven in comparison to the speed of input shaft 28 faster than they are in the fifth gear ratio.

Reverse drive results by engaging clutch 68 and brake 74, and releasing the other friction elements. Carrier 42, the underdriven output of gear unit 32, underdrives ring gear 48 through clutch 68. The second gear unit 34, whose carrier 52 is held against rotation due to engagement of brake 74, further tends to overdrive sun gear 46 and reverses its direction of rotation in comparison to the speed and direction of carrier 42. The third gear unit 36, with ring gear 56 held, produces a speed reduction driving carrier at relatively low speed in the reverse directional sense.

In FIG. 3, the various components on the transmission are marked with the same reference numbers as corresponding components of FIG. 1. The first gear set 32' is a compound planetary gear unit including a sun gear 38, ring gear 40, carrier 42', and two sets of planetary pinions 88, 90 of equal size, supported on a carrier 42'. The first pinion set 88 is in continuous meshing engagement with sun gear 38; the second pinion set 90 is in continuous meshing engagement with ring gear 40 and with the first pinion set 88. Carrier 42' is secured to the case 70 against rotation.

If non-synchronous gear ratio changes between first gear and second gear are desired, a one-way coupling can be provided in parallel with brake 74. Preferably, the coupling provides a one-way drive connection between the case 70 and the mutually connected ring gear 56 and carrier 50. The coupling produces a drive connection to the case 70 in first gear and it overruns in all other gears.

The description that follows describes operation of the kinematic arrangement of FIG. 3 for and each of the forward and reverse gear ratios with reference to the schedule of FIG. 2.

When the transmission operates in the first gear ratio, forward clutch 64 is engaged and brake 74 is engaged, thereby holding ring gear 56 against rotation on the transmission casing 70. The first speed ratio, produced in the third gear unit 36, is taken at carrier 58, which is underdriven in relation to the speed of input 28. Carrier 58 drives output shaft 84.

An upshift to the second speed ratio results by maintaining forward clutch 64 engaged, engaging brake 72, and disengaging brake 74. Sun gears 46 and 54 are driven at the speed of input shaft 28. Ring gear 48 provides the torque reaction on case 70. Carrier 50, which is underdriven in the second gear unit 34, drives ring gear 56, and carrier 58 is underdriven at a faster speed than in first gear.

An upshift to the third speed ratio from the second speed ratio results upon disengaging brake 72 and engaging clutch 68', while maintaining the forward clutch 64 engaged. The sun gears 38, 46 and 54 are driven at the speed of input shaft 28. Carrier 42', held against rotation on case 70, provides the torque reaction. Ring gear 40, which is underdriven in the first gear unit 32, drives ring gear 48 through clutch 68'. Carrier 50 and ring gear 56 are under driven in relation to the speed of input 28, but are overdriven in relation to ring gear 40. Carrier 58 and output 84 are underdriven, but at a faster speed than in second gear.

Maintaining forward clutch 64 engaged, engaging clutch 66, and disengaging the other friction elements produces the fourth forward speed ratio. Sun gears 46 and 54, and the mutually interconnected carrier 50-ring gear 56 subassembly are driven at the speed of input shaft 28 through clutches 64 and 66, respectively. Therefore, the third gear unit 36 is locked-up and output shaft 84 is driven at the speed of shaft 28, a direct drive speed ratio.

The fifth speed ratio is produced upon engaging clutches 66 and 68', and disengaging clutch 64. Carrier 42' provides the torque reaction on the case 70. Ring gear 40, the underdriven output of the first gear unit 32, drives ring gear 48 through clutch 68'. Carrier 50 and ring gear 56 are driven at the speed of the input shaft 28 through clutch 66. Sun gear 46, the overdriven output of the second gear unit 34, drives sun gear 54. Therefore, carrier 58 and output shaft 84 are overdriven compared to the speed of input shaft 28.

The sixth forward speed ratio results when clutch 66 and brake 72 are engaged, and the other friction elements are disengaged. Carrier 50 and ring gear 56 are driven at the speed of input shaft 28 through clutch 66. Ring gear 48 is held against rotation, thereby providing a torque reaction on the case 70. The second gear unit 34 overdrives sun gears 46 and 54. An additional speed increase occurs in the third gear unit 36, whereby carrier 58 and shaft 84 are overdriven in comparison to the speed of input shaft 28 faster than they are in the fifth gear ratio.

Reverse drive results by engaging clutch 68' and brake 74, and disengaging the other friction elements. Ring gear 40, the underdriven output of gear unit 32, underdrives ring gear 48 through clutch 68'. The second gear unit 34, whose carrier 52 is held against rotation due to engagement of brake 74, further overdrives sun gears 46 and 54, and it reverses their direction of rotation in comparison to the speed and direction of ring gear 40. The third gear unit 36, with ring gear 56 held, produces still a speed reduction driving carrier 58 at relatively low speed in the reverse directional sense.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple-speed ratio automatic transmission for an automotive vehicle, comprising:

an input;

an output;

a planetary gear system comprising first, second and third planetary gear units, each gear unit having a sun gear, a ring gear, planet pinions meshing with the sun gear and the ring gear, and a carrier rotatably supporting the planet pinions, the first gear unit being one of a simple planatary gear unit having first planet pinions, and a compound planatary gear unit having second planet pinions meshing with the sun gear of the first gear unit and third planet pinions meshing with the ring gear of the first gear unit and with the second planet pinions, the input being driveably connected to the sun gear of the first gear unit, the output being driveably connected to the carrier of the third gear unit, the ring gear of the third gear unit being driveably connected to the carrier of the second gear unit, one of the carrier of the first gear unit and the ring gear of the first gear unit being non-releasably secured against rotation, the sun gear of the second gear unit being driveably connected to the sun gear of the third gear unit;

a first brake for holding against rotation and releasing the ring gear of the second gear unit;

a second brake for holding against rotation and releasing the carrier of the second gear unit and ring gear of the third gear unit;

a first clutch for driveably connecting and disconnecting the input and the sun gears of the second and third gear units;

a second clutch for driveably connecting and disconnecting the input and carrier of the second gear unit; and a third clutch for releasably driveably connecting the other of the carrier of the first gear unit and the ring gear of the first gear unit to the ring gear of the second gear unit.

2. The transmission of claim 1, wherein the second brake means comprises:

a friction brake including a first element driveably connected to the carrier of the second gear unit and the ring gear of the third gear unit, and a second element secured against rotation, the first element and second element adapted to engage mutually, thereby holding the carrier of the second gear unit and ring gear of the third gear unit against rotation, and to disengage, thereby releasing the carrier of the second gear unit and ring gear of the third gear unit for independent rotation.

3. The transmission of claim 1, wherein the second brake means comprises:

a friction brake including a first element driveably connected to the carrier of the second gear unit and ring gear of the third gear unit, and a second element secured against rotation, the first element and second element adapted to engage mutually, thereby holding the carrier of the second gear unit and ring gear of the third gear unit against rotation, and to disengage, thereby releasing the carrier of the second gear unit and ring gear of the third gear unit for independent rotation; and an overrunning coupling including a third element driveably connected to the carrier of the second gear unit and ring gear of the third gear unit, and a fourth element secured against rotation, and a fifth element located between the third element and fourth element for producing a one-way drive connection between the third element and fourth element.

4. The transmission of claim 1, further comprising a transmission case fixed against rotation, and wherein the second brake further comprises:

a friction brake including a first element driveably connected to the carrier of the second gear unit and ring gear of the third gear, and a second element driveably connected to the transmission case; and an overrunning coupling arranged in parallel drive relationship with the friction brake clutch, for producing a one-way drive connection of the carrier of the second gear unit and ring gear of the third gear unit to the transmission case.

5. The transmission of claim 1, further comprising a transmission case fixed against rotation, and wherein the second brake further comprises:

a friction brake including a first element driveably connected to the carrier of the second gear unit and ring gear of the third gear unit, and a second element driveably connected to the transmission case.

6. The transmission of claim 1, further comprising:

a torque converter including an impeller driveably connected to a power source, and a turbine hydrokinetically coupled to the impeller and driveably connected to the input shaft.

7. A multiple-speed ratio automatic transmission for an automotive vehicle, comprising:

an input;

an output;

a planetary gear system comprising a first compound planetary gear unit, second and third simple planetary gear units, each gear unit having a sun gear, a ring gear, planet pinions meshing with the sun gear and with the ring gear, and a carrier rotatably supporting the planet pinions, the input being driveably connected to the sun gear of the first gear unit, the output being driveably connected to the carrier of the third gear unit, the ring gear of the third gear unit being driveably connected to the carrier of the second gear unit, the carrier of the first gear unit being non-releasably secured against rotation, the sun gear of the second gear unit being driveably connected to the sun gear of the third gear unit;

a first brake for holding against rotation and releasing the ring gear of the second gear unit;

a second brake for holding against rotation and releasing the carrier of the second gear unit and ring gear of the third gear unit;

a first clutch for driveably connecting and disconnecting the input and the sun gears of the second and third gear units;

a second clutch for driveably connecting and disconnecting the input and carrier of the second gear unit; and a third clutch for releasably driveably connecting the ring gear of the first gear unit to the ring gear of the second gear unit.

8. The transmission of claim 7, wherein the second brake means comprises:

a friction brake including a first element driveably connected to the carrier of the second gear unit and the ring gear of the third gear unit, and a second element secured against rotation, the first element and second element adapted to engage mutually, thereby holding the carrier of the second gear unit and ring gear of the third gear unit against rotation, and to disengage, thereby releasing the carrier of the second gear unit and ring gear of the third gear unit for independent rotation.

9. The transmission of claim 7, wherein the second brake means comprises:

a friction brake including a first element driveably connected to the carrier of the second gear unit and ring gear of the third gear unit, and a second element secured against rotation, the first element and second element adapted to engage mutually, thereby holding the carrier of the second gear unit and ring gear of the third gear unit against rotation, and to disengage, thereby releasing the carrier of the second gear unit and ring gear of the third gear unit for independent rotation; and an overrunning coupling including a third element driveably connected to the carrier of the second gear unit and ring gear of the third gear unit, and a fourth element secured against rotation, and a fifth element located between the third element and fourth element for producing a one-way drive connection between the third element and fourth element.

10. The transmission of claim 7, further comprising a transmission case fixed against rotation, and wherein the second brake further comprises:

a friction brake including a first element driveably connected to the carrier of the second gear unit and ring gear of the third gear unit, and a second element driveably connected to the transmission case; and an overrunning coupling arranged in parallel drive relationship with the friction brake clutch, for producing a one-way drive connection of the carrier of the second gear unit and ring gear of the third gear unit to the transmission case.

11. The transmission of claim 7, further comprising a transmission case fixed against rotation, and wherein the second brake further comprises:

a friction brake having a first element driveably connected to the carrier of the second gear unit and ring gear of the third gear unit, and a second element driveably connected to the transmission case.

12. The transmission of claim 7, further comprising:

a torque converter including an impeller driveably connected to a power source, and a turbine hydrokinetically coupled to the impeller and driveably connected to the input shaft.

* * * * *